United States Patent [19]

Siniscal et al.

[11] 4,280,615
[45] Jul. 28, 1981

[54] BUNDLE ENTRY DEVICE

[75] Inventors: Paul D. Siniscal, Hollis; David L. Hebert, Amherst; J. Paige Benzing, Milford, all of N.H.

[73] Assignee: Rockwell International Corporation, Pittsburgh, Pa.

[21] Appl. No.: 111,491

[22] Filed: Jan. 10, 1980

[51] Int. Cl.³ .............................................. B65G 43/08
[52] U.S. Cl. .................................... 198/470; 198/476
[58] Field of Search ................ 198/469, 470, 476, 600

[56] References Cited

U.S. PATENT DOCUMENTS

| 3,900,096 | 8/1975 | Nack et al. | 198/476 |
| 3,952,859 | 4/1976 | Holt et al. | 198/461 |
| 3,977,513 | 8/1976 | Rushforth | 198/365 |

Primary Examiner—James L. Rowland

[57] ABSTRACT

An apparatus for receiving bundles of newspapers from a first conveyor and for discharging the bundles into a second conveyor which is travelling in a direction substantially normal to the direction of travel of the first conveyor, the apparatus including a bundle receiving surface, means for laterally positioning each bundle at a preselected position on the surface and driven bundle engaging paddles for moving the bundles in a direction that has a component of movement that is substantially parallel to the direction of travel of the second conveyor.

4 Claims, 6 Drawing Figures

BUNDLE ENTRY DEVICE

BACKGROUND OF THE INVENTION

In the production of newspapers on modern high speed rotary printing presses now being done largely by offset lithography, the printed and folded newspapers come from the presses in rapidly moving continuous streams. The stream of papers goes to a stacker where individual bundles of newspapers are prepared, each of which contains a predetermined number of individual newspapers. From the stacker the bundles, after being tied, are commonly directed to a distribution system that delivers the bundles to a plurality of dispatching or mailing stations for ultimate distribution to the consumer. An example of one of such distribution or newspaper mailroom system is described in Rushforth U.S. Pat. No. 3,977,513 which issued Aug. 31, 1976. The system described in this patent illustrates one of the problems encountered in proper distribution of the newspaper bundles, viz. the transfer of the bundles from a conveyor moving in one direction to another conveyor that is moving in a different direction. In view of the fact that the delivery speeds are very high, it is readily apparent that swift, accurate transfer of bundles between conveyors comprising the distribution system are absolute necessities.

It is a principle object of this invention to provide an improved apparatus for receiving bundles of newspapers from a first conveyor system and discharging them onto a second conveyor system which is travelling in a direction different from that of the first conveyor.

Another object of this invention is to provide an improved newspaper bundle handling apparatus in which bundles received from a first conveyor are accurately positioned on a receiving surface and then discharged onto a second conveyor in a direction having a component of movement parallel to the direction of travel of the second conveyor.

An additional object of this invention is to provide a bundle handling apparatus in which positioning of the bundle is automatically initiated by appropriately located bundle sensing means.

Other objects and advantages of this invention will be in part obvious and in part explained by reference to the accompanying specification and drawings in which:

DESCRIPTION OF THE PREFERRED EMBODIMENT

The apparatus of this invention provides an improved apparatus whereby bundles of newspapers can be removed from a first conveyor system and then discharged onto a second conveyor system that is travelling in a direction normal to the direction of travel of the first conveyor. As was mentioned above, this apparatus is valuable for use in receiving bundles of newspapers and discharging them onto a distribution system within a newspaper mailroom. The type of distribution system with which this apparatus is that described in the previously mentioned Rushforth U.S. Pat. No. 3,977,513. In this system bundles are introduced from a plurality of newspaper stackers onto a continuously moving cart conveyor system. The bundles that are placed into the individual carts are subsequently directed past a plurality of discharge points where they are loaded into vehicles for transport.

Figure 1:
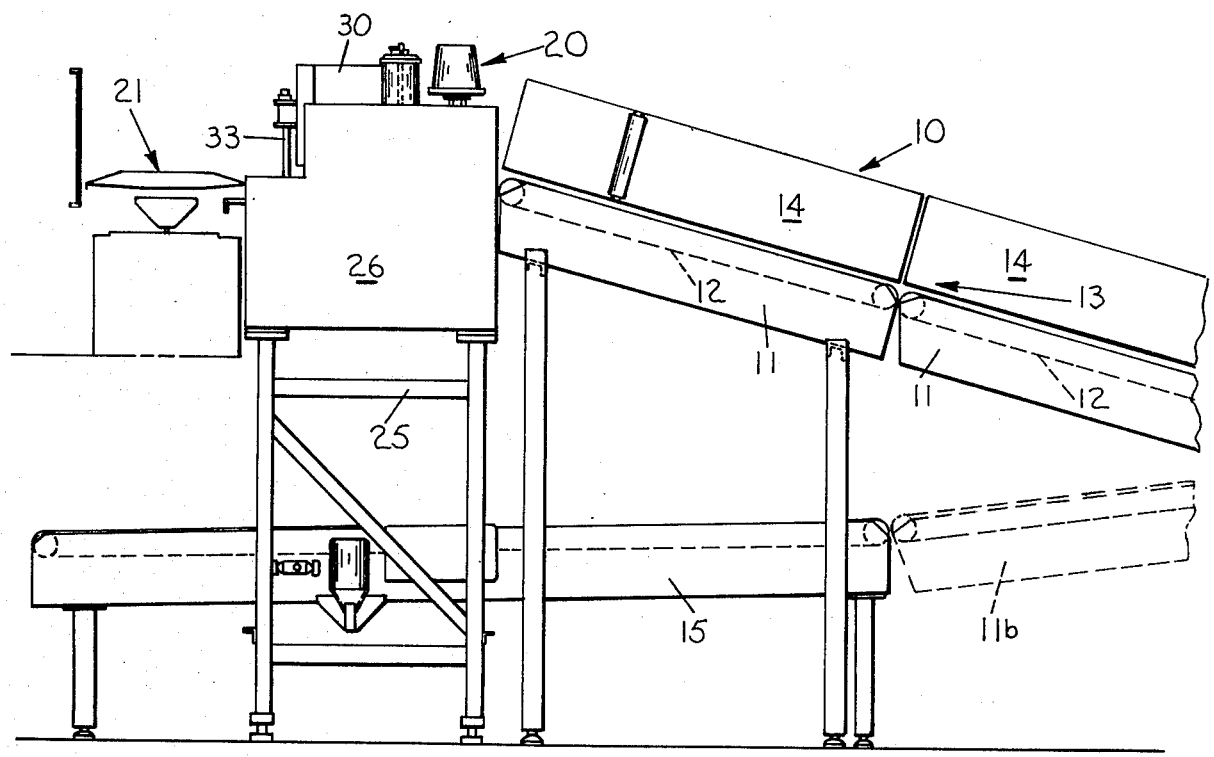
FIG. 1 is a side elevation of the bundle handling apparatus of this invention looking in a direction perpendicular and parallel to the respective directions of bundle travel.
Figure 2:
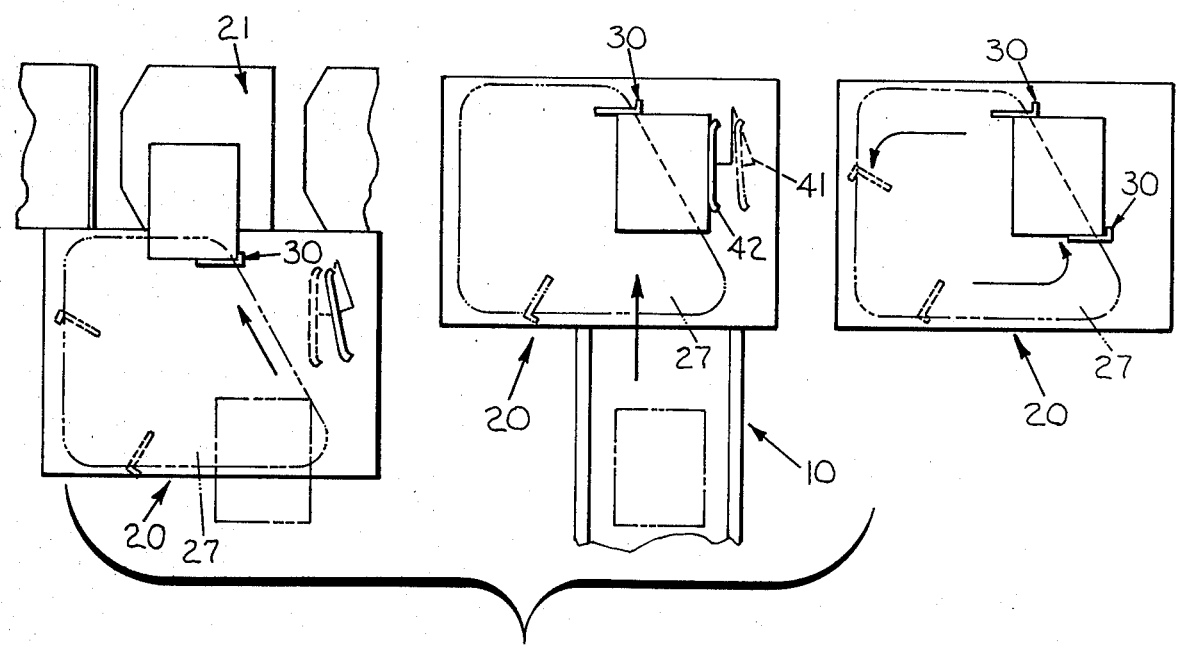
FIG. 2 is a schematic plan view showing the manner in which the apparatus of this invention receives and discharges a bundle of newspapers.
Figure 3:
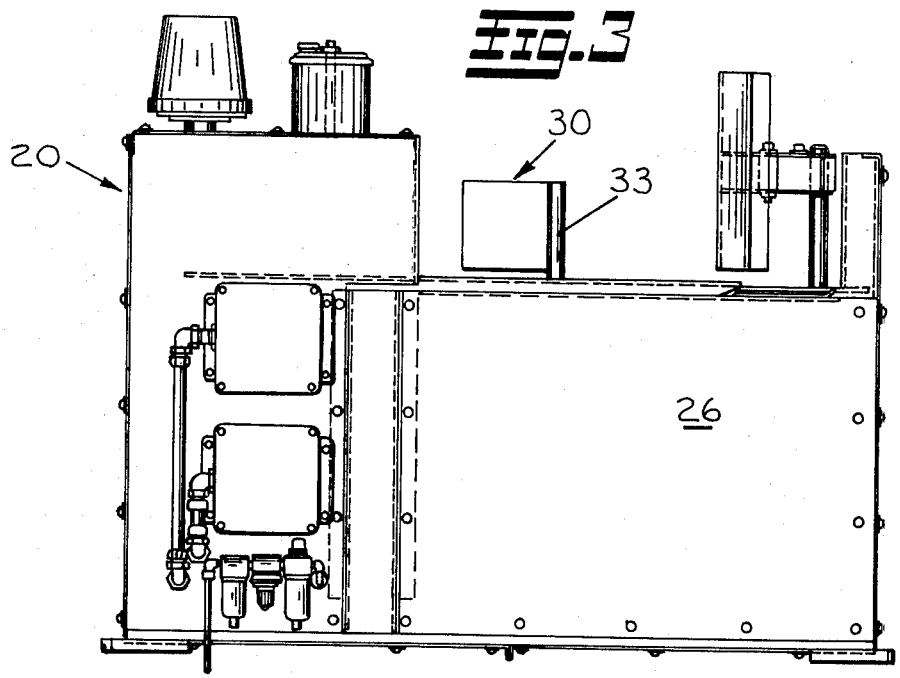
FIG. 3 is a front elevation viewing the apparatus in the direction in which a bundle is received.

Referring to FIG. 1 of the drawings, there are two basic systems that are involved in the overall distribution of bundled newspapers to their ultimate discharge locations. In FIG. 1, numeral 10 indicates generally a first conveyor system that receives bundles of newspapers from a stacking and bundling apparatus. This first conveyor system comprises a plurality of sections 11 each of which has an endless belt 12 for advancing bundles in the direction indicated by arrow 13. In addition to endless belts 12, appropriate side guards 14 are included to prevent the accidental loss of bundles of newspapers during the movement along this first conveyor system. Under those operating conditions when the bundles are to be moved to a second conveyor, the conveyor sections 11 will occupy the positions shown by the solid lines in FIG. 1. In the event it should for some reason be desired to divert bundles from the usual discharge path, then the right-hand-most conveyor section 11 can be dropped to the alternate position which is shown in dotted lines as numeral 11b. When section 11b is in the lowered position, the bundles will continue on along the lower transport or conveyor section 15.

The part of the overall transport system with which this invention is directly concerned is the bundle receiving and discharging apparatus that has been indicated generally by numeral 20. It is this apparatus 20 that is responsible for receiving bundles from first conveyor system 10 and discharging them onto the second conveyor system 21. This second conveyor system 21 has been shown diagramatically in FIG. 1 and is basically similar to that in the previously cited U.S. Pat. No. 3,977,513, so that no further description of this portion of the overall system will be presented in this text.

Figure 4:
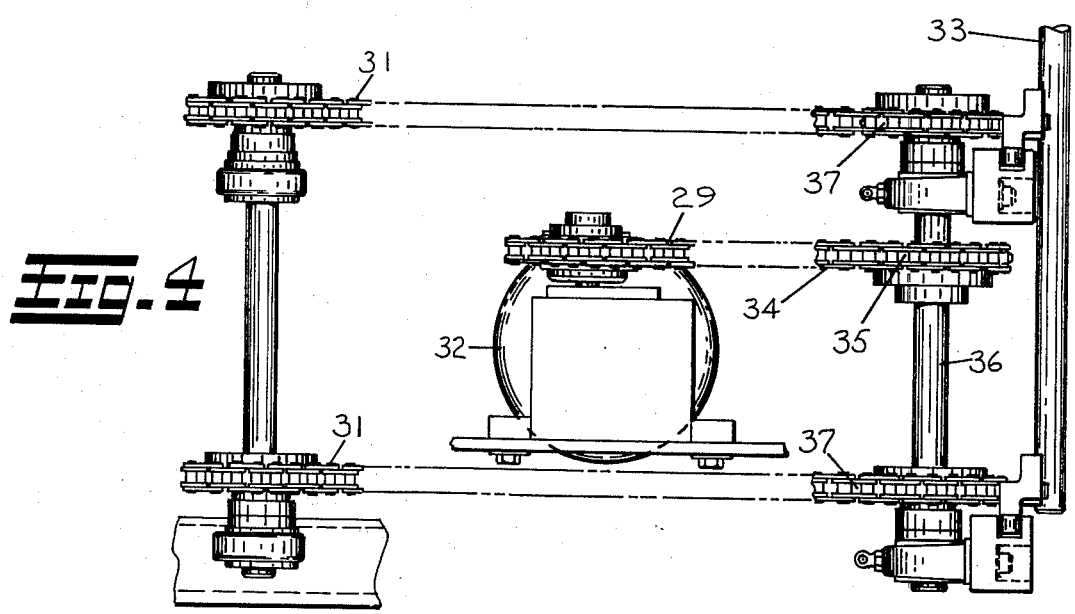
FIG. 4 is a front elevation with parts of the structure removed to illustrate the manner in which the bundle moving paddles of the apparatus are driven.
Figure 5:
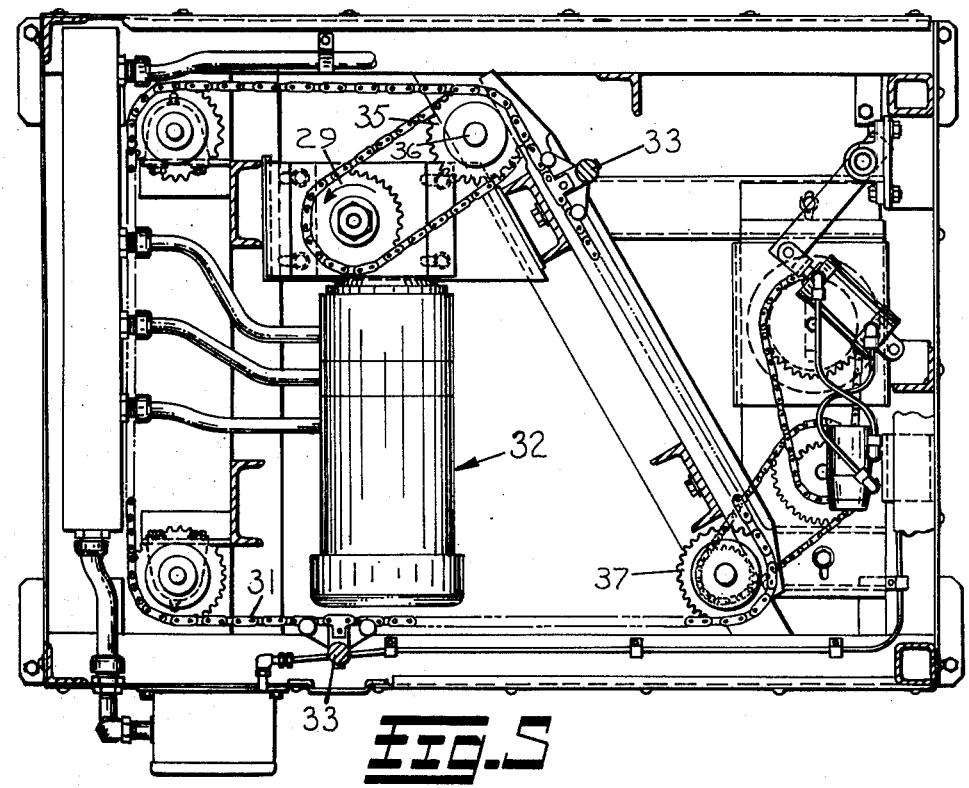
FIG. 5 is a plan view with the bundle receiving surface removed to show the path of travel of the bundle engaging paddle carriers.
Figure 6:
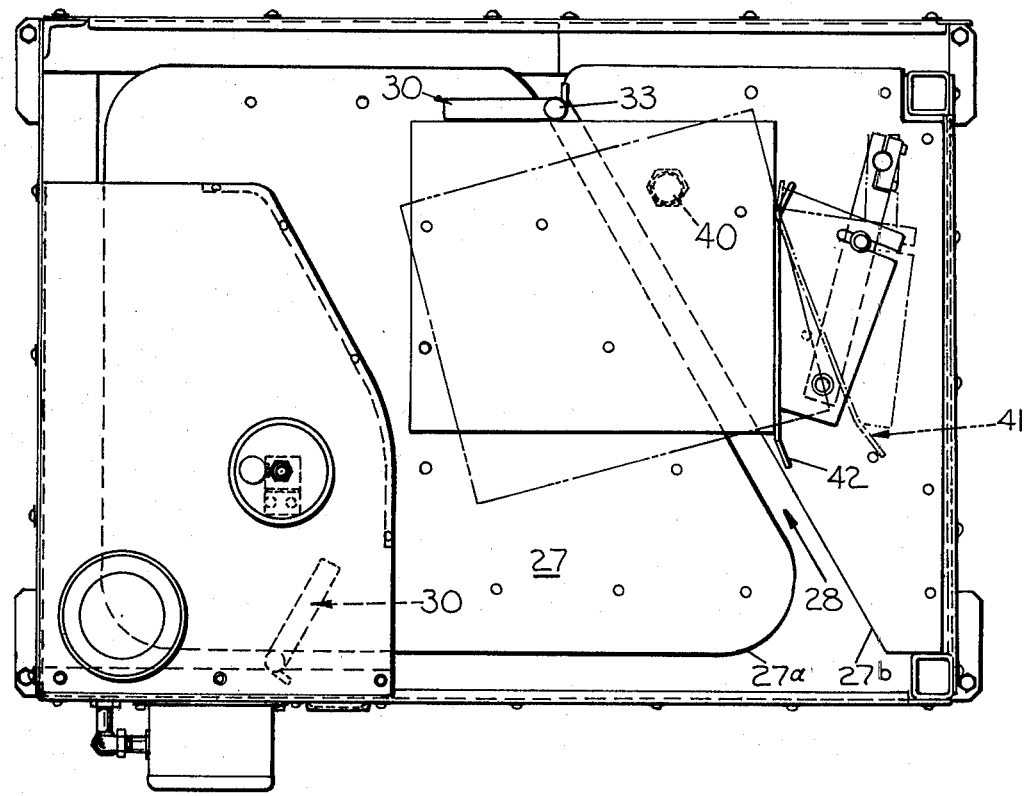
FIG. 6 is a plan view of the apparatus of this invention showing the bundle guide means and the bundle receiving surface.

Apparatus 20 comprises a supporting structure including sub-structure 25 made up of structural steel, such as angle iron, pipes and the like. Also included is an infra-structure 26 comprising confining plates that are joined together to form an appropriate housing for the drive and operating component of the apparatus, to be later described. The supporting structure, and more particularly, the infra-structure, includes a bundle receiving surface 27 (see FIG. 6). It will be noted that bundle receiving surface 27 is actually made up of two separate pieces 27a and 27b, which between them define an elongated opening 28. Parts 27a and 27b are configured so that the elongated opening 28 extends in a direction which defines an acute angle with respect to the direction of travel of the second conveyor 21. The bundle receiving and discharging apparatus 20 also includes a plurality of paddles which are mounted for movement in a pre-determined path and which are driven by driven endless members 31, members 31 in turn being operated by appropriate driving means 32. As can best be seen in FIG. 5, the paddles 30 are integrally joined to vertical posts 33 and these posts are in turn secured by appropriate means to the operating links of driven endless members 31. Upon energization of motor 32 thru a clutch 38, and torque limiter 43, the sprockets 29 (see FIG. 4) operates the endless chain 34 that turns sprocket 35 that is keyed or otherwise intricately joined to the vertical shaft 36. It will be seen that rotation of shaft 36 will effect rotation of the roller chain sprockets 37 and that these will in turn effect rotation of endless members 31. The torque limiter 43 provides protection for the mechanical elements in the event that a bundle is misplaced and cannot be ejected. For operator protection if a bundle does not reach the sensor 40 within a pre-determined amount of time, a jam indicator light will be lit and the paddles will be deactivated while the jam is cleared. The immediate conveyor, ahead of the device 20 will also be deactivated through its own clutch and brake located between its motor and reducer, similar to the device of 20 (FIG. 5), motor 32, clutch 38, brake 39 and reducer 45.

Turning now to the method in which the present apparatus operates, bundles of newspapers advance along the conveyor sections 11 in the direction 13 at a rate of speed such that they are propelled one after the other onto bundle receiving surface 27. At this time the paddles 30 are located in the positions shown in FIG. 6 of the drawings. With the paddles in the positions as thereshown, the bundle is thrown against the backsurface of the paddle which is closest to the second conveyor means 21 thereby stopping its movement on receiving surface 27. When the bundle impacts against the stop, the center of gravity of the bundle causes the bundle to rotate center clockwise against the side guide 42 absorbing some of the impact energy and reducing the amount of rebound after impact. After this has occurred, sensor means 40, which in this case is a capacitive sensor, signals to the bundle positioning means 41, and the movable arm 42 of positioning means 41 moves from its dotted to its solid line position so that the bundle assumes the position shown in FIG. 6 with its edges generally parallel to and perpendicular to the direction of travel of conveyor means 21. After this positioning has been accomplished, the driving means 32 causes further forward movement of driven endless members 31 so that the paddle 30, which acted as a stop for the bundle, moves away from the bundle and the next following paddle engages the rear corner of the bundle. Further advancing movement of the paddle causes the bundle to move in a direction which has a component of movement parallel to the direction of travel of second continuous conveyor 21. The speed and direction of travel of the pushers, and, therefore, of the bundles, is sufficient that the bundle can be discharged onto the continuously moving second conveyor 21.

Although the present invention has been described in connection with a preferred embodiment, it should be understood that modifications and variations may be resorted to without departing from the spirit and scope of the invention as those skilled in the art will readily understand. Such modifications and variations are considered to be within the purview and scope of the appended claims.

We claim:

1. An apparatus for receiving bundles of newspapers from a first conveyor system and for discharging them onto a second conveyor system which is travelling in a direction substantially normal to the direction of the first conveyor, said apparatus comprising:
   (a) a supporting structure including a bundle receiving surface located between the first and second conveyors;
   (b) bundle engaging paddles operably connected to driving means including a driven endless member to which said paddles are connected, said paddles being connected to said driven endless member at spaced locations such that the back surface of the paddle which is closest to the second conveyor serves as a stop for a bundle arriving on said receiving surface; and
   (c) side guide means which moves to adjust the lateral position of each successive bundle received on said receiving surface so that it can be transferred to the second conveyor by said paddle next following said paddle which acted as a stop for a bundle received in the receiving surface.

2. An apparatus as defined in claim 1 wherein said driven endless member and said paddles are disposed to push the bundles onto the second conveyor in a direction having component of movement parallel to the direction of travel of the second continuous conveyor.

3. An apparatus as defined in claim 1 wherein said movable side guide means includes actuator means for moving said side guide between a retracted position and an extended position where it places a bundle in the proper location for discharge onto the second continuous conveyor.

4. An apparatus as defined in claim 3 wherein sensor means is provided to respond to the presence of a bundle on said bundle receiving surface and to cause said actuator means to move side guide means to adjust the lateral position of each such bundle.

* * * * *